Patented July 31, 1923.

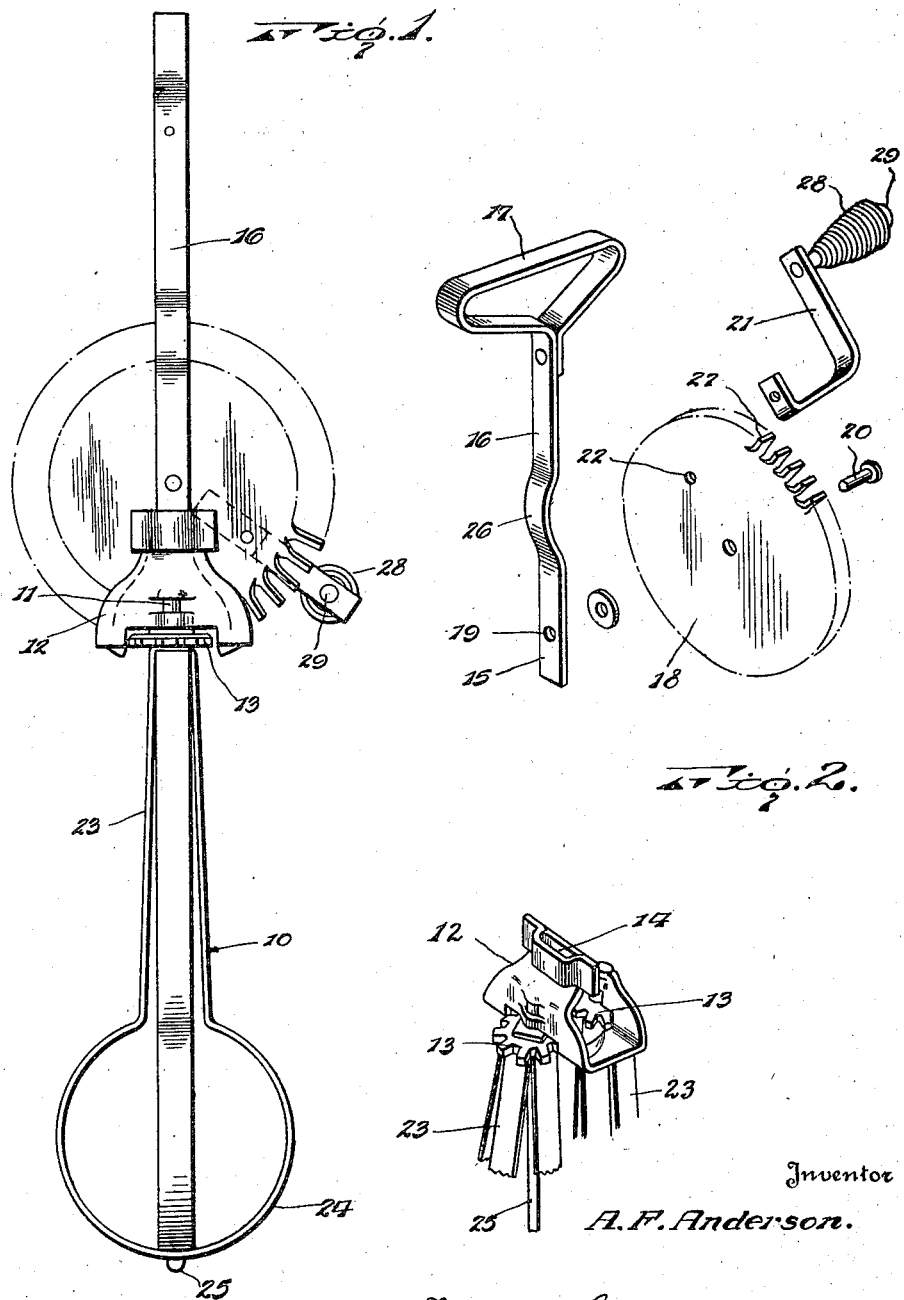

1,463,493

UNITED STATES PATENT OFFICE.

AUGUSTUS F. ANDERSON, OF BANGOR, MAINE.

EGG BEATER.

Application filed April 10, 1922. Serial No. 551,116.

*To all whom it may concern:*

Be it known that I, AUGUSTUS F. ANDERSON, a citizen of the United States, residing at Bangor, in the county of Penobscot and State of Maine, have invented certain new and useful Improvements in Egg Beaters, of which the following is a specification.

My invention relates to mixers, kneaders, and beaters, but has particular reference to rotary egg beaters of the multiple blade type and the principal object of the invention is to provide an egg beater with a detachable grip or handle.

Ordinary egg beaters are of comparatively great length and rather top-heavy so that if they are left in the dish they are apt to upset the same on account of the overhang of the upper portion of the egg beater.

In order to overcome this disadvantage I construct my egg beater in two separable parts so that the beater proper may be left in the dish, while the upper end or handle is removed, in this manner obviating accidents.

Another object of the invention is to simplify the construction and make the parts as cheaply as possible.

In the accompanying drawing one embodiment of the invention is illustrated.

Figure 1 shows a side elevation of an egg beater assembled, and

Figure 2 is a perspective view of the detachable parts of the device.

In the drawing the reference numeral 10 represents the beater blades which are pivoted as at 11 in the head 12 and provided with pinions 13 secured at the upper ends of the blades. The head 12 is formed with a socket 14 intended to receive the lower end 15 of the grip or handle 16. The handle 16 is preferably made from one piece of metallic band and bent to form a loop 17 at its outer end and given a convenient shape to be gripped by the operator's hand. The end of the band under the loop 17 is riveted to the main portion of the grip 16.

A gear wheel 18 adapted to mesh with the pinions 13 is pivoted at 19 on a pin 20 on the grip 16 and has a lever 21 rigidly secured thereto at 22 by means of a rivet. The gear wheel 18 is spaced from the grip 16 by means of a small washer 30 in order to prevent the side of the wheel from rubbing against the grip 16. The lever 21 is bent in U-shape in order to straddle over and project beyond the outside of the head 11 so as not to interfere with the free movement of the lever for turning the gear wheel 18. The lever 21 terminates with a roller 28, preferably made of coiled wire and revolubly mounted on the lever spindle 29, which is secured in the free end of the lever.

The grip 16 has an outward bend at 26 in order to clear the gear teeth 27, which are somewhat wider than the body of the gear wheel 18.

The egg-beater proper is of the usual construction and needs no detailed description, as forming no part of the present invention. It will suffice to say that the blades 10 are preferably made of thin metallic bands, very flexible, and having straight arms 23 rigidly secured to the pinions 13, the bands forming circular loops 24 at the lower end of the beater. The blades with the pinions 13 are pivoted at 11 at the top and also at the bottom of a yoke 25, so as to partake in the rotation of the pinions.

The use of the device is as follows:

With the lower end 15 of the grip 16 assembled in the socket 14 of the head 12, the apparatus is lowered into the material to be beaten up contained in a dish or bowl. The lower end of the yoke 25 is now made to rest on the bottom of the dish and with a light pressure on the handle 17, the two main parts of the apparatus are held together in upright position, as shown in Fig. 1, whereupon the gear wheel 18 is turned, by means of the lever 21. As the gear teeth 27 of the wheel 18 now mesh with the teeth of the pinions 13, the latter will start to revolve together with the beater blades 10. As soon as the material in the bowl has been sufficiently stirred, the handle 16 is lifted out of its socket 14 in the lower portion of the apparatus, which may now repose, if so desired, in the dish without upsetting the latter and spilling its contents.

It is to be noted that in my device the beater blades and the pinions at the upper ends of the same are carried by the head and the master or driving gear with the crank for actuating the same are carried by the handle or grip member. There is no permanent or other fastening between the grip member and the head, the grip being merely engaged at its lower end in the socket 14 of the head and held there by the slight pressure exerted upon the grip during the operation of the device. If an upward pressure or pull be exerted upon the handle or grip member, the said member with the driving gear will be withdrawn from the head, and if the user of the device should through carelessness or other cause fail to withdraw the beater from the commodity being mixed or whipped, the bowl or other container will not be overturned by reason of the weight of the upper portion of the device overbalancing the bowl, but the grip member with the gear mounted thereon will merely slide or fall out of the socket 14 as the device tilts toward the side of the bowl. Loss of the contents of the bowl or breakage of the bowl will be thereby avoided. At the same time, the structure is such that, when the device is in use, no unusual force need be exerted upon the grip or handle member to maintain it in engagement with the head and the entire device in an upright operative position.

Having thus described the invention, what is claimed as new is:

1. In an egg beater, the combination with a head, beater blades revolubly mounted thereon and provided with pinions; of a grip, a socket of rectangular cross section being formed in said head for detachably connecting it with said grip, a gear wheel pivoted on the grip adapted to mesh with said pinions, and a lever on said gear wheel, said grip being formed of a flat metallic band, the outer end of which is bent together until its flat sides contact and is secured by a rivet to form a looped handle.

2. An egg beater comprising a hand grip member and a head member, a socket being provided in said head member adapted to slidably receive the end of the hand grip member and being keyed thereto, thereby permitting the latter to be easily removed out of said socket, beater blades revolvably mounted in said head, pinions on said beater blades; a gear wheel journalled on said hand grip member adapted to mesh with said pinions when said members are assembled, and an operating lever rigidly secured on said gear wheel.

3. A device for the purpose set forth comprising a head carrying blades and pinions at the upper ends of the blades, and a grip member carrying a master gear to mesh with the pinions at the upper ends of the blades, the grip member being constructed to detachably engage the head and be manually held in engagement therewith.

4. A device for the purpose set forth comprising a head provided at one side at its upper end with a socket, blades carried by said head and depending therefrom, pinions at the upper ends of the heads, a grip member consisting of a bar having its lower end adapted to engage the socket on the head and be held in engagement therewith manually, and a driving gear mounted on the grip member and meshing with the pinions at the upper ends of the blades.

In testimony whereof I affix my signature.

AUGUSTUS F. ANDERSON.